United States Patent [19]

Smith et al.

[11] Patent Number: 5,387,989
[45] Date of Patent: Feb. 7, 1995

[54] MODIFIED TECHNIQUE FOR FABRICATING LOW NOISE FLOODLIT CHMSL HOLOGRAMS

[75] Inventors: Ronald T. Smith, Torrance; John E. Wreede, Azusa; Mike Virgadamo, Pasadena; Richard Upper, Studio City, all of Calif.

[73] Assignee: Hughes Aircraft Company, Los Angeles, Calif.

[21] Appl. No.: 995,117

[22] Filed: Dec. 22, 1992

[51] Int. Cl.⁶ ............................ G02B 5/32; G03H 1/30
[52] U.S. Cl. ............................ 359/13; 340/479; 359/14; 359/19; 359/20; 359/25
[58] Field of Search ............... 359/13, 14, 19, 20, 359/25, 15, 22, 24; 340/479, 705

[56] References Cited

U.S. PATENT DOCUMENTS

| 3,405,614 | 10/1968 | Lin et al. | 359/20 |
| 3,658,404 | 4/1972 | Greenaway | 359/20 |
| 3,941,450 | 3/1976 | Spitz et al. | 359/20 |
| 4,807,978 | 2/1989 | Grinberg et al. | 359/20 |
| 4,993,790 | 2/1991 | Vick | 359/20 |
| 5,186,533 | 2/1993 | Hori | 359/13 |

FOREIGN PATENT DOCUMENTS

117792 9/1984 European Pat. Off. ............ 359/20

Primary Examiner—Martin Lerner
Attorney, Agent, or Firm—L. A. Alkov; W. K. Denson-Low

[57] ABSTRACT

A hologram structure for use in a holographic center high mounted stoplight system for a vehicle. The hologram structure includes a hologram layer having a plurality of holographic lenses formed therein, each holographic lens being configured to diffract light into a predetermined solid angular region.

2 Claims, 6 Drawing Sheets

MODIFIED TECHNIQUE FOR FABRICATING LOW NOISE FLOODLIT CHMSL HOLOGRAMS

BACKGROUND OF THE INVENTION

The disclosed invention is directed generally to holograms for center high mounted stoplights for vehicles, and more particularly to a hologram that efficiently meets the required brightness and angular coverage and to an exposure technique for recording such hologram.

Present federal regulations require center high mounted stoplights (CHMSLs) in addition to the standard stoplights mounted in the rear portion of an automobile. The high mounted stoplights are intended to maximize the visibility of the automobile braking indicators to drivers following the braking vehicle, and are commonly mounted on the rear window of an automobile.

High mounted stoplights have commonly been implemented as a standard lenticular lens, a red filter, an illuminating incandescent bulb, and a reflector enclosed in a housing that is typically secured adjacent the top or bottom of an automobile rear window. However, the bulky housing partially obscures the rearward vision of the driver, and moreover imposes limitations on the design of the automobile.

Center high mounted stoplights have been also integrated into automobile body parts such as rear decks, spoilers, roofs, which to some degree substantially reduce or remove the rearward vision problem. However, such stoplights are complex and may impose limitations on the design of the automobile.

Holographic center high mounted stoplights have also been developed in order to efficiently meet the stoplight regulations. A consideration with holograms for holographic center high mounted stoplights are the luminous intensity and angular coverage requirements. Such requirements generally include a quantitative aspect that defines luminous intensity over a defined solid angular range, and a qualitative aspect that requires visibility over a horizontal angular range that is greater than the horizontal component of the defined solid angular range. Essentially, the regulations require a brighter region generally in the center of the angular region of coverage.

A straightforward procedure for recording a hologram for a center high mounted stoplight would be to record the image of a lenticular lens array that spreads light uniformly over a selected angular coverage (e.g., two lenticular arrays rotated 90 degrees with respect to each other and laminated together). A consideration with this procedure, however, includes the generation of spurious holograms since the lenses of the array would cover overlapping areas. Such spurious holograms reduce the efficiency of the desired stoplight hologram and moreover limit the see through clarity of the hologram. Also, precise control of the direction of the diffracted light is difficult.

SUMMARY OF THE INVENTION

It would therefore be an advantage to provide a hologram for a vehicle center high mounted stoplight that efficiently provides the desired luminous intensity distribution without excessive spurious holograms.

Another advantage would be to provide a hologram for a vehicle center high mounted stoplight wherein the direction of diffraction can be precisely controlled.

A further advantage would be to provide a hologram for a vehicle center high mounted stoplight that is optimized for both the playback source and the geometry of the rear window that supports the hologram.

The foregoing and other advantages are provided by the invention in a hologram structure that includes a hologram layer having a plurality of holographic lenses formed therein, each holographic lens being configured to diffract light into a predetermined solid angular region.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

Figures 1, 2:
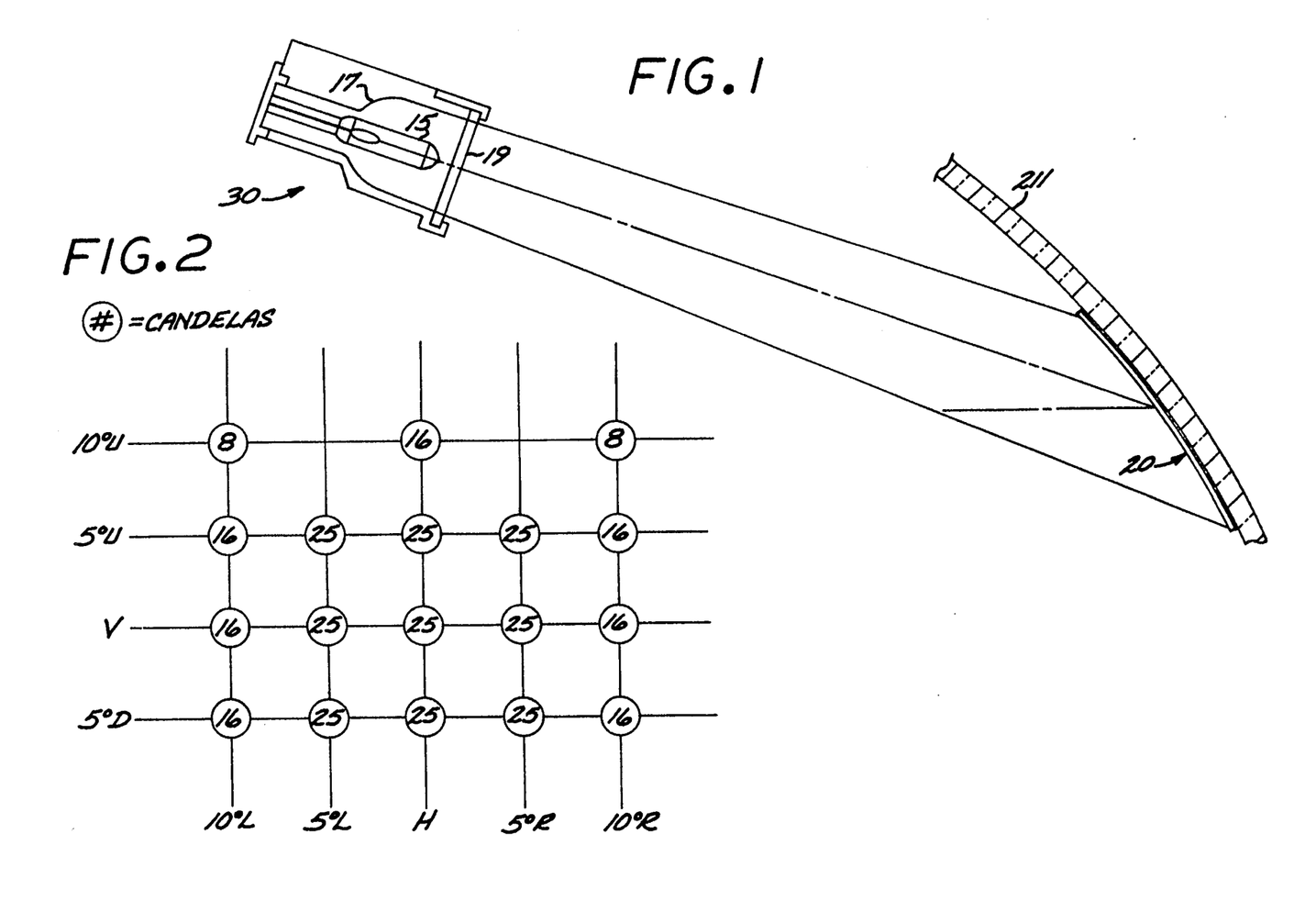
FIG. 1 sets forth a schematic sectional view illustrating a vehicle center high mounted stop light installation employing a hologram constructed in accordance with the invention.
FIG. 2 sets forth a luminous intensity distribution graph depicting present vertical and horizontal requirements in candelas for center high mounted stoplights.

Referring now to FIG. 1, shown therein is a center high mounted stoplight system which includes a hologram assembly 20 and an illumination source 30. The hologram assembly 20, which includes a volume transmission hologram described further herein, is secured to the inside surface of an automobile rear window 211, and is substantially transparent to the rearward vision of the driver. The illumination source 30 is mounted forward of the hologram assembly 20 and out of the rearward viewing angle of the driver, for example, adjacent the inside of the roof of the automobile, and illuminates the volume hologram of the hologram assembly 20 with a diverging beam.

The volume hologram of the hologram assembly is constructed to provide, when illuminated by the illumination source 30, an appropriate image that is visible from behind the automobile over the appropriate vertical and horizontal viewing angles.

The illumination source 30 includes an incandescent lamp 15, such as a quartz halogen bulb, a parabolic reflector 17 that generally confines the illumination to the hologram assembly 20, and a high pass filter 19 having a cutoff wavelength of about 600 nanometers (nm). As a result of the wavelength dependent sensitivity of human vision, the image provided by the hologram of the hologram assembly will be perceived as red, with the apparent peak intensity being somewhere between about 600 and 620 nm. The incandescent lamp 15 is connected to the brake light actuating circuit of the automobile so as to be energized when the brake pedal is depressed.

Referring now to FIG. 2, set forth therein is a graph showing the luminous intensity (in candelas) versus angular field requirements for a center high mounted stoplight for the field defined as (a) 10 degrees up and 5 degrees down relative to a central horizontal plane that passes through the center of the CHMSL, and (b) 10 degrees left and right relative to a central vertical plane that passes through the center of the CHMSL and contains the longitudinal axis of the vehicle, as set forth in Federal Motor Vehicle Safety Standards No. 108. The numbers in the graph identify the minimum luminous intensities at those angular locations in candelas, and the entire angular field is subject to a 160 candela maximum at any given angular position.

In addition to the foregoing quantitative requirements, there is the qualitative requirement that the stoplight be visible within the central horizontal plane over a range of 45 degrees on either side of the central vertical plane (i.e., two horizontal angular regions that are mirror images of each other). By way of example, this qualitative requirement can be interpreted as requiring a luminous intensity of about 1 candela.

Figure 3:
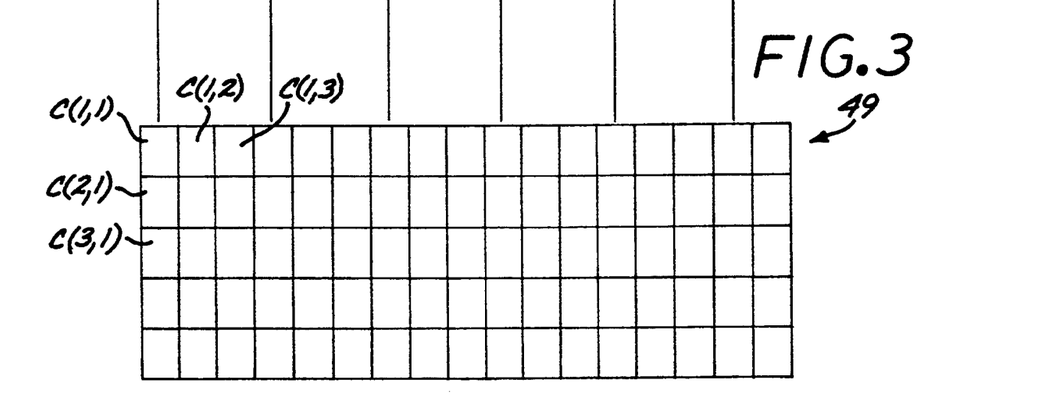
FIG. 3 schematically illustrates a planar CHMSL hologram in accordance with the invention.

Referring now to FIG. 3, schematically illustrated therein is a planar CHMSL hologram 49 in accordance with the invention prior to installation in the hologram assembly, with the surface shown being the surface that will face outside of vehicle when installed. The hologram 49 comprises a rectilinear array or grid of non-overlapping contiguous hologram cells or facets C(i,j) of identical size, each hologram cell being a holographic lenslet that produces a diffracted output having the desired solid angular coverage.

By way of reference, the top row of hologram cells C(1,j) in the figure comprises the top of the CHMSL hologram as it is positioned in the installed hologram assembly of the CHMSL system, whereby each row of holograms cells is generally aligned with the horizontal. Consistently with such orientation, the parallel edges of a cell that are generally aligned with horizontal when installed in the vehicle shall be called the top and bottom edges wherein the top edge is closest to the top of the figure and is closest to the top of the rear window when installed. Also, the parallel edges of a cell that are perpendicular to the top and bottom edges shall be referred to as the side edges. The cells C(i,j) are of identical size, and the width of a cell is measured along the top or bottom edge, while the height of a cell is measured along either of the side edges.

Figure 6A:
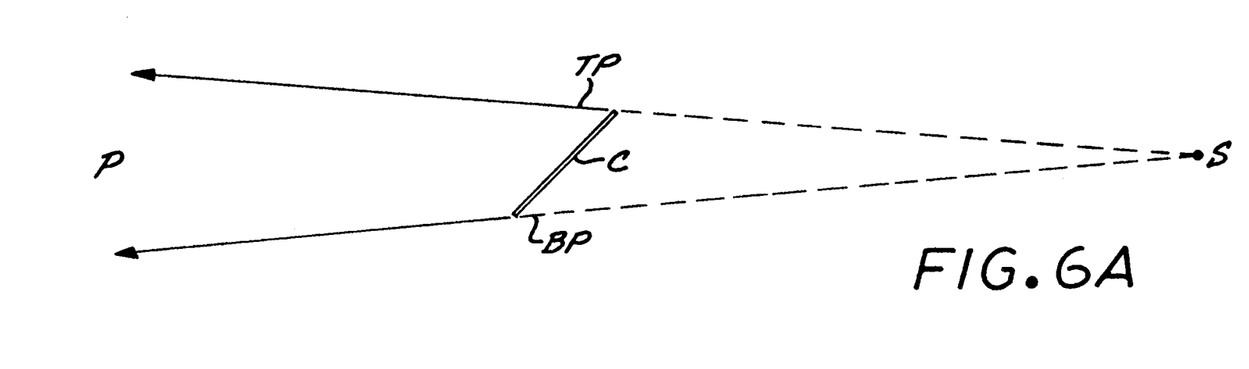
FIGS. 6A and 6B schematically illustrate the playback characteristics of each of the hologram lenslets of the hologram of FIG. 3 in elevational view and in plan view.
Figure 6B:
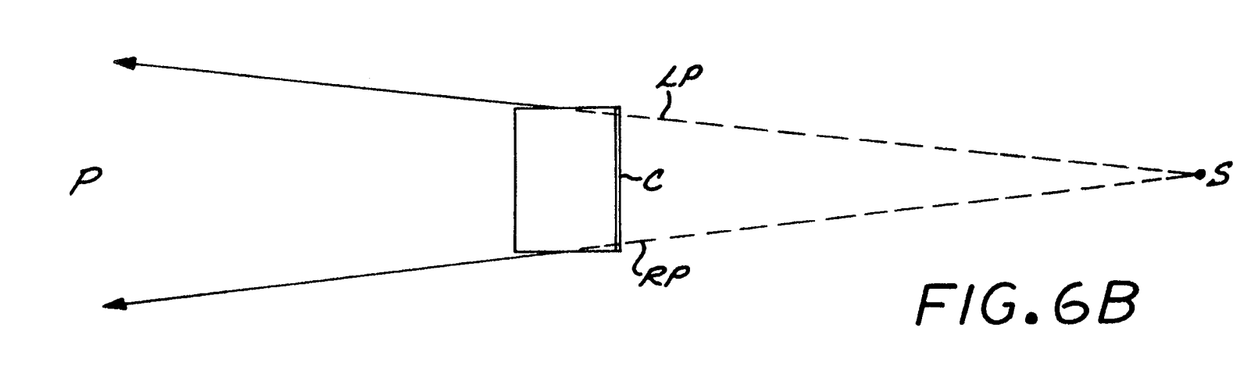

In accordance with the invention, each hologram cell C(i,j) is constructed such that upon construction each cell acts as a window for a respective point source at a specific distance behind the hologram (i.e., with the apparent point source forward of the installed hologram). Referring in particular to FIGS. 6A and 6B, schematically set forth therein are an elevational side view and a top plan view of a hologram cell C as oriented in an installed hologram assembly together with the diffracted light output beam P produced thereby. As shown in FIG. 6A, the upper and lower boundaries of the output beam P are determined by (1) a top plane TP defined by an apparent point source S and the top edge of the cell and (2) a bottom plane BP defined by the apparent point source and the lower edge of the cell. The top plane TP and the bottom plane BP are depicted by lines in FIG. 6A since such planes are orthogonal to the plane of the figure. The portions of the planes TP and BP shown by solid lines depict the playback beam limits while the portions of the such planes shown by broken lines represent the top and bottom limits of the virtual beam emanating from the apparent point source S. As shown in FIG. 6B, the lateral boundaries of the output beam P are determined by (1) a left side plane LP defined by the apparent point source S and the left edge of the cell and (2) a right side plane defined by the apparent point source S and the right edge of the cell. The left side plane LP and the right side plane RP are depicted by lines in FIG. 6B since such planes are orthogonal to the plane of the figure. As with the FIG. 6A, the portions of the planes LP and RP shown by solid lines represent the lateral limits of the playback beam while the portions of the planes LP and RP shown by broken lines depict the lateral limits of the virtual beam emanating from the apparent point source S.

From FIGS. 6A and 6B, it should be appreciated that, assuming the apparent point source S is centered laterally between the sides of a hologram cell, the angular coverage of the output beam P and the orientation of such angular coverage relative to the hologram cell depends on the location of the apparent point source S and the ratio of (a) the width of the cell and (b) the subtended cell height (i.e., the height of the cell as projected onto a plane orthogonal to the center axis of the angular coverage), which are controlled by the construction of the hologram cell. In particular, each hologram cell is exposed with a diverging object beam that emanates from a focus point and is masked at the hologram recording layer. The location of the focus point, which defines the location of the apparent source S, and the ratio of the cell width to the subtended height are selected to provide the desired angular coverage for the cell. Pursuant to the Federal Motor Vehicle Standards, each cell is configured to provide the majority of its diffracted light output into a solid angle having upper and lower limits of 10 degrees up and 5 degrees down relative to horizontal, and lateral limits of 10 degrees on either side of a vertical plane that is parallel to the longitudinal axis of the vehicle. In other words, the solid angular region is centered on a line that passes through the center of the cell, is about 2.5 degrees above horizontal, and is in a vertical plane that is parallel to the longitudinal axis of the vehicle.

Depending upon the specific requirements such as the curvature of the installed hologram assembly, all cells can be exposed to diffract identically, or they can be exposed to have different diffraction characteristics. Further, the cells can be exposed one cell at a time or several cells at a time.

By way of illustrative example, the array of FIG. 3 includes 5 rows and 17 columns for a total of 85 hologram cells, and is configured for installation on a rear window that is at 27.8 degrees from horizontal. Each hologram cell is 9.289 mm wide and 11.18 mm high.

Figure 4:
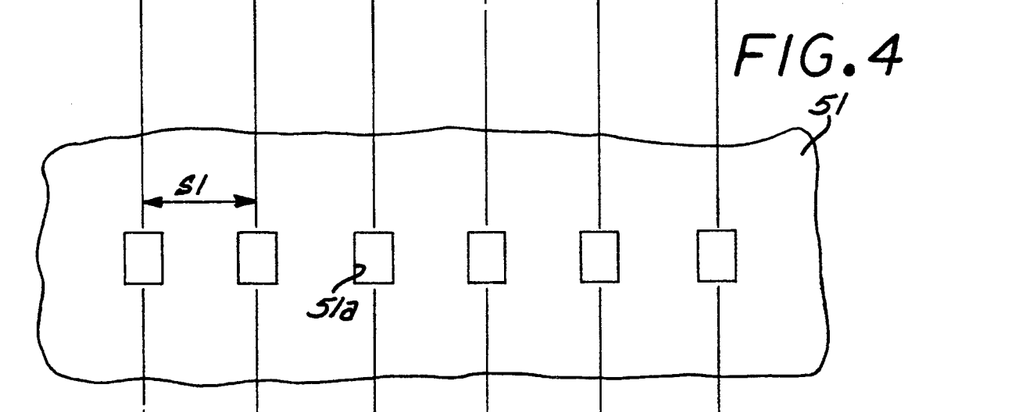
FIG. 4 sets forth by way of illustrative example a schematic illustration of a mask that is utilized in the construction of the hologram of FIG. 3.
Figure 5:
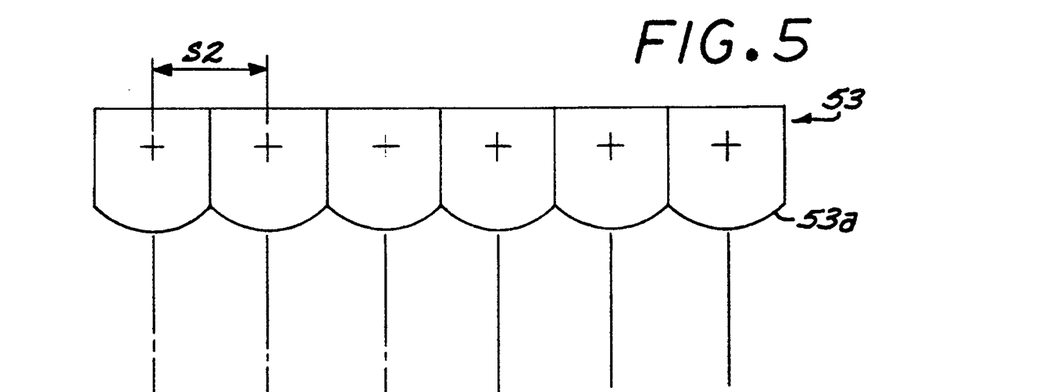
FIG. 5 sets forth by way of illustrative example a schematic illustration a spherical lens array that is utilized in the construction of the hologram of FIG. 3.
Figure 7:
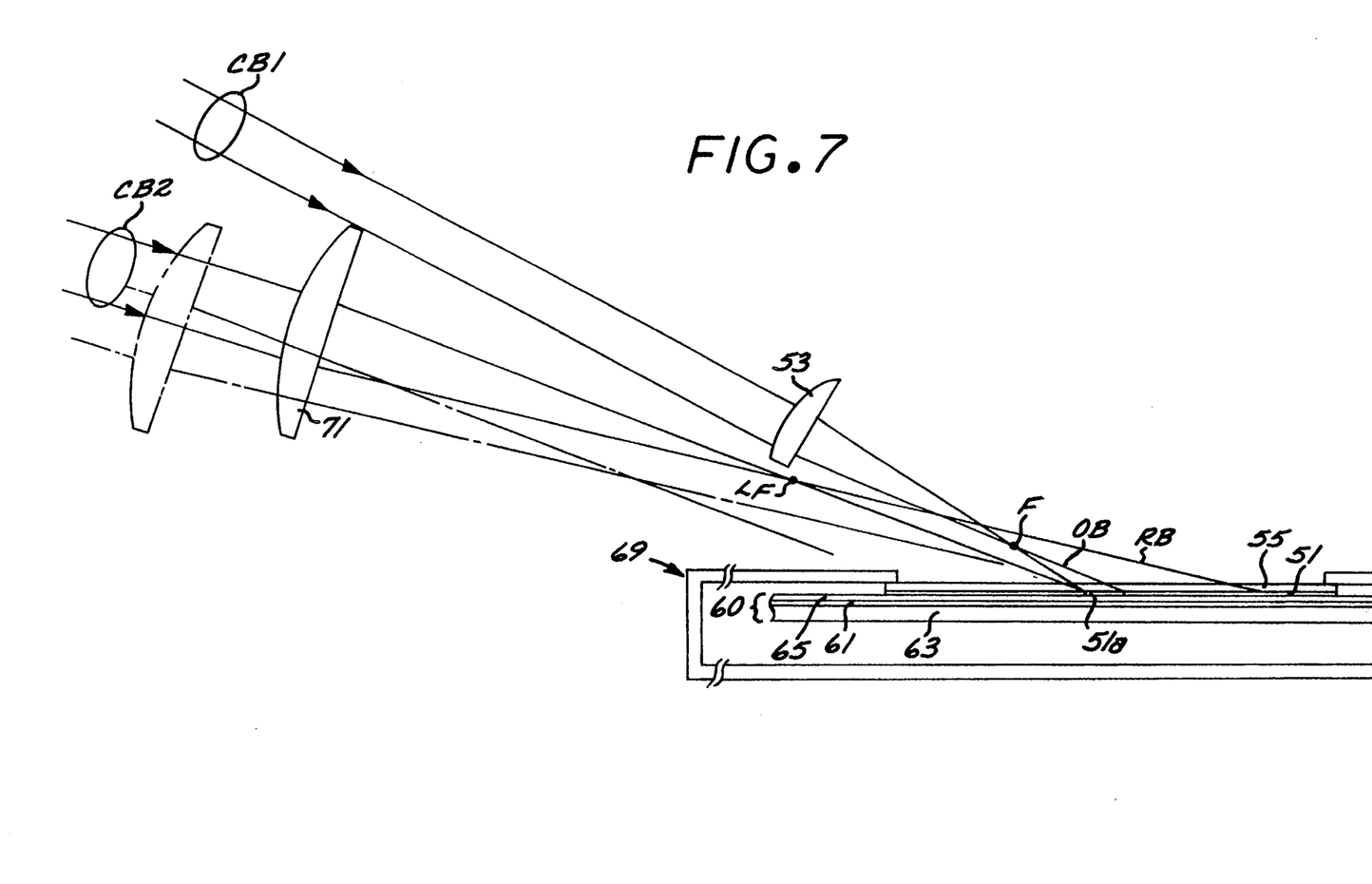
FIG. 7 sets forth by way of illustrative example an exposure system for constructing the CHMSL hologram of FIG. 3.

Referring now to FIG. 7, set forth therein by way of illustrative is an exposure set up for recording a CHMSL hologram in accordance with the invention by a sequence of exposures wherein each exposure exposes a plurality of uniformly spaced non-contiguous cells in a row. The exposure set up employs a mask 51, as schematically depicted in FIG. 4, having uniformly spaced openings 51a of the same size as each of the hologram cells of the CHMSL hologram and having a horizontal center-to-center spacing S1 that is equal to three times the horizontal center-to-center spacing between adjacent hologram cells. The exposure set up further includes a horizontal linear array 53 of plano-convex spherical lenses 53a, as schematically depicted in FIG. 5, having the same number of spherical lenses 53a as the number of openings 51a in the mask 51. The horizontal center-to-center spacing S2 between the spherical lenses 53a is the same as the horizontal center-to-center spacing S1 between the mask openings 51a.

As more particularly shown in FIG. 7, a holographic recording assembly 60 comprised of a holographic recording layer 61 disposed on a glass substrate 63 and covered by a thin cover layer 65 is disposed beneath an exposure mask assembly 50 comprised of the mask 51 and a mask supporting substrate 55. The hologram recording assembly 60 and the exposure mask assembly 50 are oriented with the exposure mask 51 and the thin cover layer 65 facing each other and separated by a very thin layer of index matching fluid 57 which also fills in the mask openings 51a. Hologram recording illumination passes through the mask substrate 55, the mask openings 51a, the index matching fluid 57, and the thin cover layer 65 to the holographic recording layer 61. By way of illustrative example, the holographic recording assembly 60 is movable, for example by a computer driven motor, such that hologram forming cells that correspond to the hologram cells of the CHMSL hologram can be selectively positioned beneath the mask openings 51a for exposure. In order to limit exposure to the hologram forming cells uncovered by the mask openings, the mask and the mask substrate are secured in the opening of an opaque top cover of a conventional oil gate trough 69, wherein the top cover is sufficiently large to ensure that only the portions of the hologram recording layer beneath the mask openings 51a will be exposed to construction illumination for all exposure positions of the hologram recording layer.

The object beams OB are produced by portions of a collimated beam CB1 which pass through the spherical lenses 53, converge down to respective focus points F, and then diverge to provide diverging object beams OB for the hologram forming cells of the hologram recording layer uncovered by the mask openings. Based on the geometrical considerations discussed above relative to FIGS. 6A and 6B, the size of the hologram forming cells and the position of the spherical lens array relative to the mask openings is selected so as to produce the desired angular coverage in the vertical and horizontal directions for the resulting hologram cells.

The reference beams for exposure are produced from of a collimated beam CB2 which passes through a cylindrical lens 71, converges down to a line focus LF, and then diverges in the vertical direction to provide respective diverging reference beams RB for the hologram forming cells uncovered by the mask openings. The cylinder axis of the cylindrical lens is orthogonal to the plane of FIG. 7, and the central axis of the cylindrical lens is parallel to the axis of the collimated beam CB2. The reference beam RB essentially comprises a portion of the output of a line source, and is based on utilizing a playback beam that converges to an approximate line focus and then diverges such that it is diverging when it illuminates the installed CHMSL hologram. The particular example of FIG. 7 contemplates a CHMSL which is illuminated from above as illustrated in FIG. 1. The top of the CHMSL hologram corresponds to the left edge of the hologram recording layer that is perpendicular to the plane of the figure.

Exposure of each subset of hologram forming cells uncovered by the mask openings 51a is accomplished by positioning the hologram recording assembly to the intended cells to be beneath the mask openings and illuminating the unmasked cells with construction illumination via the spherical lens array and the cylindrical lens. This requires movement of the hologram recording assembly between exposures, as indicated by the additional broken line depiction of the hologram recording assembly in FIG. 7.

By way of illustrative example, the hologram cell rows are exposed in sequence, and within each row cell, subsets of the row can be exposed in a sequence. Thus, for example, for each row i, the hologram recording assembly would be moved to uncover a first cell subset comprised of the cells C(i,j) wherein j is equal to 1, 4, 7, 10, 13, 16. After the hologram recording assembly has settled, such first cell subset would be exposed with construction illumination. The hologram recording assembly would then be moved to uncover a second cell subset comprised of the cells C(i,j) wherein j is 2, 5, 8, 11, 14, 17. After the hologram recording assembly has settled, such second cell subset would be exposed with construction illumination. The hologram recording assembly would then be moved to uncover a third cell subset comprised of the cells C(i,j) wherein j is 3, 6, 9, 12, 15. This subset includes only 5 cells, and the unused mask opening would be beyond the perimeter of the hologram recording layer. After the hologram recording assembly has settled, such third cell subset would be exposed with construction illumination. The foregoing procedure would then be repeated for the next row, if any.

In the foregoing procedure wherein the hologram recording layer is moved relative to the mask and wherein the object and reference beam forming lenses are stationary, each hologram forming cell is exposed with substantially the same average reference beam incidence angle where such average reference beam angle is formed between the plane of the cell and a line from the center of the cell to the reference beam focus. However, since the intended playback source is an approximate line source, the average included angle between the playback beam and the cell will not be the same for all cells, which will result in reduced brightness if constructed with respective reference beams having substantially the same average incidence angle. In order to more accurately emulate the playback source, the average reference beam incidence angle can be changed for each row of cells such that the reference beam average incidence angle for each cell more closely approximates the playback average incidence angle intended for that cell. The change in the reference beam focus location is accomplished by appropriately positioning the cylindrical lens 71 for each row as required, as represented by the broken line depiction thereof in FIG. 7. For the particular example of a CHMSL hologram wherein the top of the hologram is closer to the approximate line focus of the playback illumination, the solid line depiction of the cylindrical lens 71 schematically represents the position of the lens for construction of the top row of cells, while the broken line depiction of the cylindrical lens 71 schematically represents the position of the lens for construction of the bottom row of cells.

Figure 8:
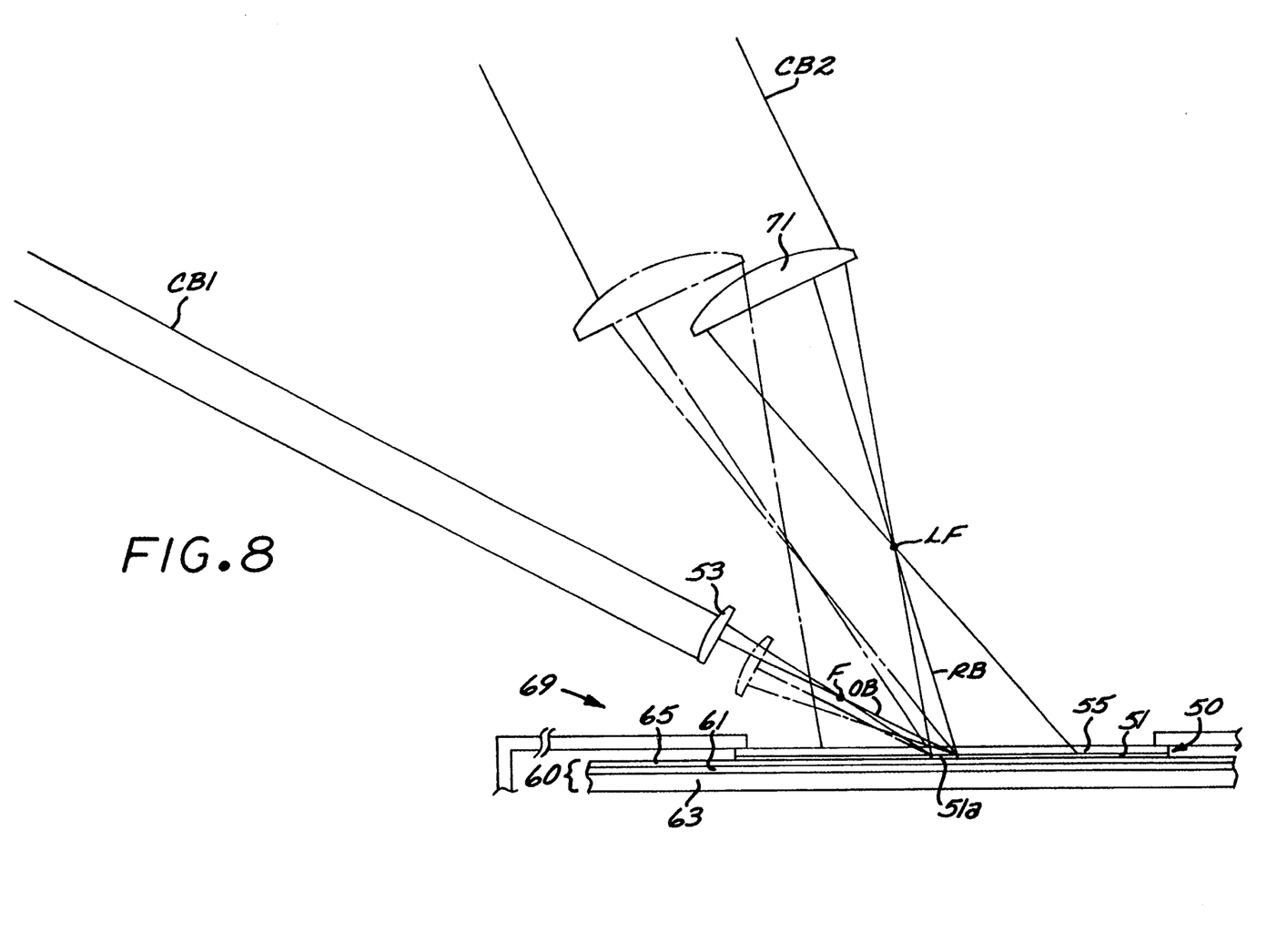
FIG. 8 sets forth by way of further illustrative example an exposure system for constructing the CHMSL hologram of FIG. 3.

Referring now to FIG. 8, set forth therein is an exposure system that is similar to the exposure system of FIG. 7 and which illustrates compensation for an installed CHMSL hologram having significant vertical curvature (i.e., the vertical cross section of the installed hologram is curved). The exposure system of FIG. 8 further illustrates construction of a hologram that is intended to receive playback illumination from a light source located below the rear window, for example in a recess in the rear package deck that is typically next to the bottom of a vehicle rear window.

The vertical curvature of an installed CHMSL hologram is compensated by having different object beam focus point locations for each row of hologram forming cells, such that each hologram cell as installed diffracts light in the appropriate direction. In particular, for each cell row the required focus location is determined on the basis of its installed configuration, and the object beam focus is positioned accordingly. The change in focus points for construction of each row of hologram cells can be achieved by appropriately positioning the spherical lens array relative to the mask openings for each row of cells as depicted by the broken line depiction of the spherical lens array in FIG. 8. For the particular example of a CHMSL hologram wherein the top edge of the installed hologram corresponds to the leftmost edge of the hologram recording layer as viewed in FIG. 8, and the installed hologram has a concave curvature as viewed from outside the rear window, the broken line depiction of the spherical lens array schematically represents the position of the lens array for exposure of the bottom row of cells. In such position, the object beam focus is closer to the cells in order to compensate for the steeper angle of the bottom row of hologram cells in the installed CHMSL hologram. As also shown in FIG. 8, the position of the reference beam forming cylindrical lens 71 is also changed for exposure of each row of cells so such that the reference beam average incidence angle for each cell more closely approximates the playback average incidence angle intended for that cell as installed. For the particular example of a vertically curved CHMSL hologram wherein the top of the hologram is closer to the approximate line focus of the playback illumination, the solid line depiction of the cylindrical lens 71 schematically represents the position of the lens for construction of the top row of cells, while the broken line depiction of the cylindrical lens 71 schematically represents the position of the lens for construction of the bottom row of cells.

Figure 9:
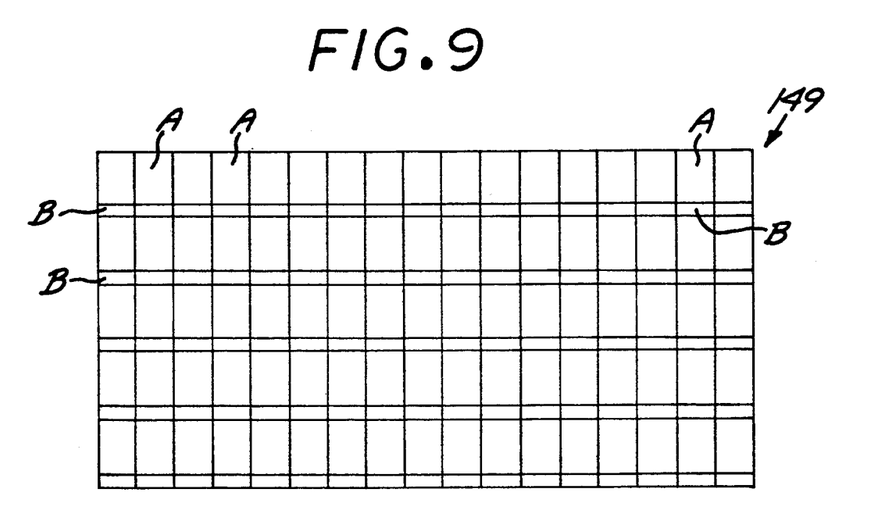
FIG. 9 schematically illustrates a further CHMSL hologram in accordance with the invention which includes first hologram cells for diffracting light into the required central region and second hologram cells for diffracting light into the required horizontal regions outside of the required central region.

Holograms in accordance with the foregoing are designed to meet the Federal requirements of intensity within the central region of 10° L to 10° R in the horizontal and 5° D to 10° U in the vertical. The requirement for horizontal visibility outside that region might possibly be satisfied by scattered light. However, such scattered light might not provide sufficient light outside of the central region in the horizontal direction. FIG. 9 sets forth by way of illustrative example a CHMSL hologram in accordance with the invention which includes hologram cells for providing the required horizontal coverage. The CHMSL hologram of FIG. 9 in particular includes single rows of hologram cells A alternatingly interleaved with rows of hologram cells B. Each row of hologram cells A is substantially similar to a row of hologram cells C of the hologram of FIG. 3, and each cell A is constructed to diffract light into the required central region in the same manner as the hologram cells C of the hologram of FIG. 3. Each row of hologram cells B includes horizontally non-overlapping contiguous cells of the same width as the hologram cells A but much shorter height. The hologram cells B are constructed to provide coverage over the 45° left to 45° right horizontal region, for example by being recorded with cylindrical lenses or highly truncated spherical lenses. The hologram cells A cover a larger area than the hologram cells B, and the ratio of total areas is determined on the basis of the desired distribution of light between the hologram cells A and the hologram cells B which can be determined as follows. The luminous intensity required for the secondary cells B is about 1/10 of the luminous intensity required for the primary cells A. The solid angular coverage of the primary cells A is about 25 degrees by 25 degrees while the solid angular coverage of the secondary cells B is about 90 degrees by 10 degrees (assuming spread in the vertical direction as a result of a playback beam having angular spread). Assuming an average luminous intensity of about 22 candelas for the primary cells A, multiplying the solid angular coverage of the primary cells A by the average luminous intensity of 22 provides an illumination factor of 13,750 for the primary cells A. Assuming an average luminous intensity of about 2.2 candelas for the secondary cells B, multiplying the solid angular coverage by the average luminous intensity of 2.2 candelas provides an illumination factor of 1980 for the secondary cells B. Thus, the area of the primary cells should be about 7 times as large as the area of the secondary cells. For the particular example of FIG. 9 in which there is a one-to-one correspondence between primary cells A and secondary cells B, each cell A should be about 7 times as big as each B cell, and since cells A and cells B have the same width, the height of the B cells should be about 1/7 the height of the A cells.

By way of illustrative example, an exposure system substantially similar to the exposure systems of FIGS. 7 or 8, as appropriate for the particular application, can be utilized to construct the hologram of FIG. 9. In particular, the primary hologram cells A of the hologram of FIG. 9 are constructed in the same manner as the hologram cells of FIG. 3, except that the rows are non-contiguous.

The secondary hologram cells B of the hologram of FIG. 9 can be constructed, for example, with an array of lenses that produce object beams that diverge or spread primarily in the horizontal direction and an appropriate mask. For example, the lens array for the object beams can comprise an array of cylinder lenses or an array of truncated spherical lenses whose foci are positioned at an appropriate location relative to the mask such that the installed hologram cells B provide diffracted light over the horizontal angular range of 45° left to 45° right. The spread of the playback source will typically produce a vertical angular coverage of about 5° up to 5° down. The mask for exposure of the secondary hologram cells B can comprise the same mask as utilized for construction of the primary hologram cells A if the A cell areas of the recording layer are rendered inert after exposure to A hologram cell forming illumination, for example by adjusting the exposure to saturate the holographic recording layer, or by flooding the A cells with white light or ultraviolet light after exposure. The A cell mask remains in place, and the recording assembly is appropriately positioned to uncover B cell locations, which would be subjected to B hologram cell forming illumination. Although the areas subjected to B cell forming illumination would be the size of the A cells, only the B cell areas would be recorded since the A cell areas had been rendered inert.

Alternatively, the A cell mask could also be used for exposing the secondary hologram cells B without rendering the A cell areas inert by inserting a rectangular mask into object beams such that only the B cells are exposed although A cell size areas are uncovered by the A cell mask.

Figure 10:
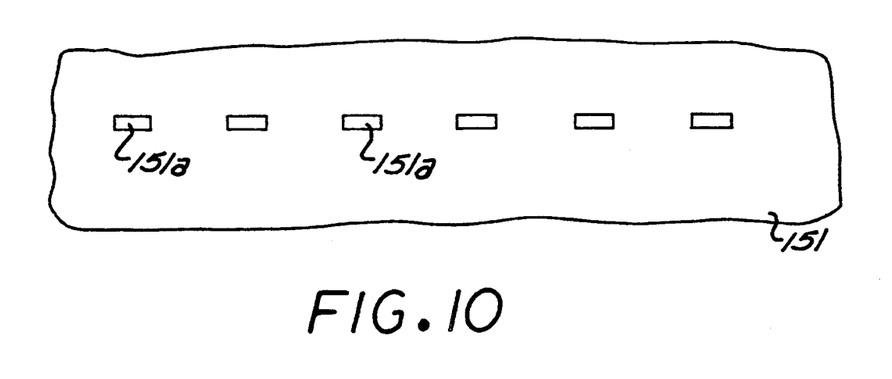
FIG. 10 shows a mask that can be utilized for the exposure of the secondary hologram cells of FIG. 9.

As a further alternative, a separate mask 151, schematically illustrated in FIG. 10, having mask openings 151a could be utilized for exposure of the secondary hologram cells B.

It should be appreciated by persons skilled in the art that the foregoing exposure procedures are complex and time consuming, and that holograms made pursuant to such procedures can be readily utilized as master holograms for making copies pursuant to copy techniques known in the art.

The foregoing has been a disclosure of a hologram structure for a vehicle center high mounted stoplight that advantageously has reduced spurious holograms, provides for precise control of the direction of the diffracted illumination, and is optimized for both the playback source and the geometry of the rear window that supports the hologram.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic center high mounted stoplight system for a vehicle, comprising:

a light source for providing a reconstruction beam;

a hologram layer;

a first array of non-overlapping holographic lenses formed in said hologram layer, each holographic lens of said first array being responsive to said reconstruction beam for diffracting light into a first predetermined diverging solid angular region to produce an image of a masked point source, wherein said first predetermined diverging angular region is identical for all lenses of said first array and is defined by the dimensions of each cell and the location of the point source image produced thereby; and a second array of non-overlapping holographic lenses formed in said hologram layer and non-overlapping with respect to said holographic lenses of said first array, each holographic lens of said second array being responsive to said reconstruction beam for diffracting light into a second predetermined diverging solid angular region to produce an image of a masked point source, wherein said second predetermined diverging angular region is identical for all lenses of said second array and is defined by the dimensions of each cell and the location of the point source image produced thereby.

2. The hologram structure of claim 1 wherein said first array comprises rows of first hologram lenses, and wherein said second array comprises rows of second hologram lenses which are alternatingly interleaved with said rows of first hologram lenses.

* * * * *